(12) United States Patent
Odaka (10) Patent No.: US 7,335,330 B2
(45) Date of Patent: Feb. 26, 2008

(54) METHOD OF PRODUCING SINTERED CARBIDE

(75) Inventor: Fumio Odaka, Niiza (JP)

(73) Assignee: Bridgestone Corporation, Tokyo (JP)

( * ) Notice: Subject to any disclaimer, the term of this patent is extended or adjusted under 35 U.S.C. 154(b) by 772 days.

(21) Appl. No.: 10/492,790

(22) PCT Filed: Oct. 15, 2002

(86) PCT No.: PCT/JP02/10657

§ 371 (c)(1),
(2), (4) Date: Apr. 16, 2004

(87) PCT Pub. No.: WO03/033434

PCT Pub. Date: Apr. 24, 2003

(65) Prior Publication Data

US 2004/0262821 A1    Dec. 30, 2004

(30) Foreign Application Priority Data

Oct. 16, 2001    (JP) .............................. 2001-318042

(51) Int. Cl.
*C04B 41/50* (2006.01)
*C01B 31/565* (2006.01)
(52) U.S. Cl. .................... 264/625; 264/29.1; 264/29.6; 264/29.7
(58) Field of Classification Search ............... 264/29.7, 264/29.1, 29.6, 625
See application file for complete search history.

(56) References Cited

U.S. PATENT DOCUMENTS 6,228,293 B1    5/2001  Kriegsmann et al.
6,387,834 B1 *  5/2002  Odaka et al. ................. 501/88
6,632,761 B1 * 10/2003  Ushita et al. ................. 501/88
6,699,411 B2 *  3/2004  Odaka et al. .............. 264/29.7

(Continued)

FOREIGN PATENT DOCUMENTS

EP    357491 A  *  3/1990

(Continued)

OTHER PUBLICATIONS

Database WPI, Section Ch, Wekk 198227, Derwent Publications Ltd., London, GB; AN1982-56411E, XP002373733.

*Primary Examiner*—Carlos Lopez
(74) *Attorney, Agent, or Firm*—Sughrue Mion, PLLC (57) ABSTRACT

A method of producing a sintered silicon carbide using a reaction sintering method, comprising: (1) dissolving and dispersing a silicon carbide powder in a solvent to produce a mixed powder slurry, (2) flowing the resulted mixed powder into a mold and drying it to obtain a green body, (3) temporarily sintering the green body in one of a vacuum atmosphere or inert gas atmosphere at 1200 to 1900° C. to obtain a temporarily sintered first body, (4) impregnating the resulted temporarily sintered first body with a phenol resin as a carbon source, (5) temporarily sintering the resulted carbon source-impregnated temporarily sintered first body in one of a vacuum atmosphere or inert gas atmosphere at 900 to 1400° C. to obtain a temporarily sintered second body, (6) impregnating the resulted temporarily sintered second body with a melted metal silicon by a capillary phenomenon, and reacting free carbon in the above-mentioned temporarily sintered second body with the silicon sucked into the above-mentioned temporarily sintered second body by a capillary phenomenon to obtain a silicon carbide body.

3 Claims, 1 Drawing Sheet

U.S. PATENT DOCUMENTS

2002/0070485 A1  6/2002  Odaka et al.

FOREIGN PATENT DOCUMENTS

| | | | |
|---|---|---|---|
| EP | 885859 A | * | 12/1998 |
| EP | 1 103 532 A | | 5/2001 |
| JP | 54-16521 A | | 2/1979 |
| JP | 62-283871 A | | 12/1987 |
| JP | 8-151268 A | | 6/1996 |
| JP | 2001-19552 A | | 1/2001 |

\* cited by examiner

Fig.1

METHOD OF PRODUCING SINTERED CARBIDE

RELATED APPLICATION

This application claims benefit of priority based on Japanese Patent Application filed previously by the applicant, namely, Japanese Patent Application No. 2001-318042 (filing date: Oct. 16, 2001), the contents of which are herein incorporated by reference.

BACKGROUND OF THE INVENTION

1. Field of the Invention

The present invention relates to a method of producing a sintered silicon carbide and a sintered silicon carbide produced by the above-mentioned production method. More specifically, the present invention relates to a method of producing a sintered silicon carbide useful as parts for semiconductor production apparatuses, parts for electronic information equipments, parts for structures of vacuum apparatuses and the like, and having high density and high purity, and a sintered silicon carbide obtained by the above-mentioned method.

2. Description of the Related Art

Conventionally, a reaction sintering method is known as one of methods for producing a sintered silicon carbide. This reaction sintering method is composed mainly of (1) a process of dissolving and dispersing a silicon carbide powder, and a carbon powder or an organic substance composed of a carbon source, for example, carbon black, to produce a mixed powder slurry; (2) a process of flowing the resulted mixed powder into a casting mold, extrusion mold or press mold and drying this, to obtain a green body; and (3) a process of heating the green body in one of a vacuum atmosphere or inert gas atmosphere, immersing this into a fused metal silicon, and reacting free carbon in the green body with the silicon sucked into the green body by a capillary phenomenon, to obtain a sintered silicon carbide.

The sintered silicon carbide obtained by the above-mentioned production method have been conventionally used in many applications utilizing excellent properties such as high temperature strength, heat resistance, friction resistance, chemical resistance and the like.

Recently, in the fields of electronic information equipment materials and semiconductor producing materials, increase in the treatment temperature of a wafer, increase in the diameter of a wafer and increase in treatment unit have lead to a requirement of a sintered silicon carbide not manifesting thermal deformation and degeneration by washing with chemical liquid such as hydrofluoric acid and the like, having excellent heat resistance, and having high density and purity.

On the other hand, since a sintered silicon carbide obtained by the above-mentioned reaction sintering method has high strength and is limited in molding working, molding working is often conducted in a stage of production of the above-mentioned green body. In this case, because of the insufficient strength of the green body, and the like, a close attention has been required for production of a sintered silicon carbide, particularly, a sintered silicon carbide of complicated shape. Therefore, further increase in the strength of the green body has been required for improving the molding workability of a sintered silicon carbide.

DISCLOSURE OF THE INVENTION

The invention provides a method of producing a sintered silicon carbide using a reaction sintering method, comprising processes of: (1) dissolving and dispersing a silicon carbide powder in a solvent to produce a mixed powder slurry, (2) flowing the resulted mixed powder into a mold and drying it to obtain a green body, (3) temporarily sintering the green body in one of a vacuum atmosphere or inert gas atmosphere at 1200 to 1900° C. to obtain a temporarily sintered first body, (4) impregnating the resulted temporarily sintered first body with a phenol resin as a carbon source by a capillary phenomenon while subjecting the temporarily sintered first body to cold isotropic press treatment under a condition of 1 to 5 ton/cm$^2$, (5) temporarily sintering the resulted carbon source-impregnated temporarily sintered first body in one of a vacuum atmosphere or inert gas atmosphere at 900 to 1400° C. to obtain a temporarily sintered second body, (6) impregnating the resulted temporarily sintered second body with a melted metal silicon by a capillary phenomenon, and reacting free carbon in the above-mentioned temporarily sintered second body with the silicon sucked into the above-mentioned temporarily sintered second body by a capillary phenomenon to obtain a silicon carbide body.

Further, the invention provides the method of producing a sintered silicon carbide as described above, wherein the above-mentioned silicon carbide powder in the above-mentioned process (1) is a silicon carbide powder obtained by a production method comprising [1] a solidification process of obtaining a solidified substance by solidifying a mixture obtained by uniformly mixing a liquid silicon compound, a liquid organic compound producing carbon by heat, and a polymerization or cross-linking catalyst, and a [2] sintering process of heat-carbonizing the resulted solid substance under a non-oxidation atmosphere, then, further sintering the solid substance under a non-oxidation atmosphere.

Further, the invention provides the method of producing a sintered silicon carbide as described above, wherein the temporarily sintered second body obtained in the above-mentioned process (5) has a bending strength of 20 MPa or more.

Even further, the invention provides a sintered silicon carbide produced by the production method that as described above.

Further, the present invention provides the sintered silicon carbide, having a volume resistivity of 1 Ωcm or less.

Further, the present invention provides the sintered silicon carbide as described above, wherein the sintered silicon carbide has a total content of impurity elements other than silicon and carbon of less than 5 ppm.

Yet, even further, the invention provides the sintered silicon carbide, having a density of 2.9 g/cm$^3$ or more.

Further, the present invention provides the sintered silicon carbide, having a bending strength of 400 MPa or more.

According to the present invention, an effect of improvement in the density and purity of the above-mentioned sintered silicon carbide is obtained.

According to the present invention, by providing a process of impregnating the temporary sintered first body with a phenol resin as a carbon source and sintering this, an action effect is obtained that molding workability is improved by increase in the strength of the temporary sintered second body.

Further, according to the present invention, improvement in the density and purity of a temporary sintered body and improvement in molding workability, which have been conventionally believed extremely difficult to satisfy simultaneously, can be satisfied simultaneously. This was truly surprising.

BEST MODES FOR CARRYING OUT THE INVENTION

The present inventors have found that when a green body after temporary sintering, namely, a temporary sintered first body is impregnated with a phenol resin as a carbon source and calcinated using a given method, in a process of producing a sintered silicon carbide, the strength of a temporary sintered second body is improved and a sintered silicon carbide having uniform density is obtained.

The present invention will be illustrated further in detail below. First, components used in production of a sintered silicon carbide of the present invention will be described.

(Silicon Carbide Powder)

The silicon carbide powder used in the present invention includes an α type powder, β type powder, amorphous powder and mixtures thereof and the like. For obtaining a sintered silicon carbide of high purity, it is preferable to use a silicon carbide powder of high purity as a raw material silicon carbide powder.

The grade of this β type silicon carbide powder is not particularly restricted, and for example, generally marketed β type silicon carbide can be used. It is preferable that the particle size of this silicon carbide powder is smaller from the standpoint of increase in density, and specifically, it is preferably from about 0.01 to 10 μm, further preferably from about 0.05 to 5 μm. When the particle size is less than 0.01 μm, handling in treating processes such as measurement, mixing and the like is difficult, an when over 10 μm, its specific surface area becomes smaller, namely, contact area with adjacent powders becomes smaller, and increase in density is difficult, undesirably.

A silicon carbide powder of high density can be obtained, for example, by a process of dissolving a silicon source containing at least one or more liquid silicon compounds, a carbon source containing at least one or more organic compounds producing carbon by heating, and a polymerization or cross-linking catalyst in a solvent, drying the solution, then, calcinating the resulted powder under a non-oxidation atmosphere.

As the above-mentioned silicon source containing a silicon compound (hereinafter, referred to as "silicon source"), those in liquid form and those in solid form can be used together, however, at least one of them should be selected from liquid compounds. As the liquid compound, polymers of alkoxysilanes (mono-, di-, tri-, tetra-) and tetraalkoxysilanes are used. Of alkoxysilanes, tetraalkoxysilanes are suitably used, and specifically, methoxysilane, ethoxysilane, propoxysilane, butoxysilane and the like are listed, and ethoxysilane is preferable from the standpoint of handling. As the polymer of tetraalkoxisilanes, there are mentioned lower molecular weight polymers (oligomers) having a degree of polymerization of about 2 to 15 and silicic acid polymers having higher polymerization degree in the form of liquid. Mentioned as the solid compound which can be used together with these compounds is silicon oxide. This silicon oxide in the above-mentioned reaction calcination method includes silica gel (colloidal super fine silica-containing liquid, containing an OH group or alkoxyl group inside), silicon dioxide (silica gel, fine silica, quartz powder) and the like, in addition to SiO. These silicon sources may be used singly or in combination of two or more.

Of these silicon sources, an oligomer of tetraethoxysilane and a mixture of an oligomer of tetraethoxysilane and fine powdery silica, and the like are suitable from the standpoints of excellent uniformity and excellent handling. As these silicon sources, substances of high purity are used, and those having an initial impurity content of 20 ppm or less are preferable and those having an initial impurity content of 5 ppm or less are further preferable.

The polymerization or cross-linking catalyst used in producing a silicon carbide powder of high purity can be appropriately selected depending on the carbon source, and when the carbon source is a phenol resin of furan resin, listed are acids such as toluenesulfonic acid, toluenecarboxylic acid, acetic acid, oxalic acid, sulfuric acid and the like. Of them, toluenesulfonic acid is suitably used.

The ratio of carbon to silicon in the process of producing a silicon carbide powder of high purity which is a raw material powder used in the above-mentioned reaction sintering method (hereinafter, abbreviated as C/Si ratio) is defined by element analysis of a carbide intermediate obtained by carbonizing a mixture at 1000° C. Stoichiometrically, when the C/Si ratio is 3.0, the free carbon content in the produced silicon carbide should be 0%, however, actually, free carbon is generated at lower C/Si ratio, by evaporation of a SiO gas produced simultaneously. It is important to previously determine composition so that the free carbon content in this produced silicon carbide powder is not an amount unsuitable for production of a sintered body and the like. Usually, in calcination at a temperature of 1600° C. or more and a pressure around 1 atm, free carbon can be controlled when the C/Si ratio is regulated to 2.0 to 2.5, and this range can be suitable adopted. When the C/Si ratio is 2.55 or more, free carbon increases remarkably, however, this free carbon has an effect of suppressing crystal growth, therefore, the C/Si ratio may also be appropriately selected depending on the crystal growth size to be obtained. The pressure of the atmosphere is lower or higher, however, the C/Si ratio for obtaining a pure silicon carbide varies, therefore, in this case, its range is not necessarily restricted to the above-mentioned C/Si ratio.

As described above, as the method of obtaining a silicon carbide powder of particularly high purity, there can be used a method of producing a raw material powder described in a method of producing a single crystal according to Japanese Patent Application Laid-open No. H9-48605 filed previously, namely, a method of producing a silicon carbide powder of high purity, characterized in that the method comprises a silicon carbide production process of uniformly mixing one or more compounds selected from tetraalkoxysilanes of high purity and tetraalkoxysilane polymers as a silicon source and an organic compound of high purity producing carbon by heating as a carbon source, and calcinating by heating, under a non-oxidation atmosphere, the resulted mixture to obtain a silicon carbide powder, and a post treatment process in which the resulted silicon carbide powder is maintained at temperatures of 1700° C. or more and less than 2000° C., and heat treatment at temperatures of 2000 to 2100° C. for 5 to 20 minutes is conducted at least once during the above-mentioned temperature maintenance, wherein the above-mentioned two processes are conducted to obtain a silicon carbide powder having a content of each impurity element of 0.5 ppm or less. Thus obtained silicon carbide powder has non-uniform size, therefore, the powder is treated by powder decomposition and classigication to give the above-mentioned particle size.

When nitrogen is introduced in the process of producing a silicon carbide powder, a silicon source, a carbon source, an organic substance containing a nitrogen source, a polymerization of cross-linking catalyst are first uniformly mixed, however, it is preferable to conduct sufficient mixing with a silicon source such as an oligomer of tetraethoxysilane, and the like, in dissolving a carbon source such as a phenol resin and the like, an organic substance containing a nitrogen source such as hexamethylenetetramine and the like, and a polymerization or cross-linking catalyst such as toluenesulfonic acid and the like in a solvent such as ethanol and the like, as described above.

(Carbon Source)

The substance used as the carbon source is an organic compound of high purity containing oxygen in the molecule and keeping carbon remaining by heating, and there are specifically listed phenol resins, furan resins, epoxy resins and phenoxy resins, and various saccharides such as monosaccharides such as glucose and the like, oligosaccharides such as sucrose and the like, polysaccharides such as cellulose, starch and the like. As these compounds, there are mainly used those in the form of liquid at normal temperature, those dissolved in a solvent, and those having a property of softening or becoming liquid by heating such as thermoplasticity or heat fusion property, for the purpose of uniform mixing with a silicon carbide powder, and of them, suitable are resol type phenol resins and novolak type phenol resins. Particularly, resol type phenol resins are suitably used.

(Silicon Source)

As the silicon source, one or more compound selected from tetraalkoxysilane of high purity, its polymer and silicon oxide are used. In the present invention, the silicon oxide includes silicon dioxide and silicon mono-oxide. As the silicon source, specifically listed are alkoxysilanes typified by tetraethoxysilane, its polymers of lower molecular weight (oligomers) and, a silicic acid polymer having further higher degree of polymerization, and the like, and silicon oxide compounds such as silica sol, fine powdery silica and the like. As the alkoxysilane, exemplified are methoxysilane, ethoxysilane, propoxysilane, butoxysilane and the like, and of them, ethoxysilane is preferably used from the standpoint of handling.

Here, the oligomer indicates a polymer having a degree of polymerization of about 2 to 15. Of these silicon sources, an oligomer of tetraethoxysilane, a mixture of an oligomer of tetraethoxysilane with fine powdery silica, and the like are suitable. As these silicon sources, substances of high purity are used, and those having an initial impurity content of 20 ppm or less are preferable and those having an initial impurity content of 5 ppm or less are further preferable.

(Method of Producing Sintered Silicon Carbide)

Next, one embodiment will be mentioned to explain a method of producing a sintered silicon carbide according to the reaction sintering method of the present invention.

One preferable embodiment of the method of producing a sintered silicon carbide of the present invention comprises a process of (1) dissolving and dispersing a silicon carbide powder in a solvent to produce a mixed powder slurry, a process of (2) flowing the resulted mixed powder into a mold and drying it to obtain a green body, a process of (3) temporarily sintering the green body in one of a vacuum atmosphere or inert gas atmosphere at 1200 to 1900° C. to obtain a temporarily sintered first body, a process of (4) impregnating the resulted temporarily sintered first body with a phenol resin as a carbon source, a process of (5) temporarily sintering the resulted carbon source-impregnated temporarily sintered first body in one of a vacuum atmosphere or inert gas atmosphere at 900 to 1400° C. to obtain a temporarily sintered second body, a process of (6) impregnating the resulted temporarily sintered second body with a melted metal silicon by a capillary phenomenon, and reacting free carbon in the above-mentioned temporarily sintered second body with the silicon sucked into the above-mentioned temporarily sintered second body by a capillary phenomenon to obtain a silicon carbide body. The above-mentioned method of producing a sintered silicon carbide will be explained in detail for every processes.

(1) Regarding the Process of Producing a Mixed Powder Slurry:

The mixed powder slurry is produced by dissolving or dispersing a de-foaming agent in a solvent.

In this dissolution and dispersion, pores can be dispersed uniformly in a green body by sufficiently stirring and mixing.

Listed as the above-mentioned solvent are water, lower alcohols such as ethyl alcohol and the like, and ethyl ether, acetone and the like. It is preferable to use a solvent having lower impurity content.

In producing a mixed powder slurry from a silicon carbide powder, an organic binder may be added. As the organic binder, a deflocculant, powder sticker and the like are listed, and as the deflocculant, nitrogen-based compounds are preferable from the standpoint of further enhancement of an effect of imparting conductivity, and for example, ammonia, polyammonium acrylate and the like are suitably used. As the powder sticker, polyvinyl alcohol urethane resins (for example, water-soluble polyurethane) and the like are suitably used. Additionally, a de-foaming agent may be added. As the de-foaming agent, a silicone de-foaming agent and the like are mentioned.

The above-mentioned stirring and mixing can be conducted by known stirring and mixing means, for example, a mixer, planetary ball mill and the like. The stirring and mixing is preferably conducted over a period of 6 to 48 hours, particularly, 12 to 24 hours.

Conventionally, a carbon source (for example, carbon black) is mixed in a process of producing a mixed powder slurry, however, in this case, close attention is necessary since mixing of a mixed powder with a carbon source is difficult and pollutes working site. In contrast, in the present invention, the above-mentioned workability problem is solved by a constitution of impregnation of a carbon source into a temporary sintered first body.

(2) Regarding the Process of Obtaining a Green Body

The green body is obtained by flowing a mixed powder slurry into a mold and molding the powder, allowing this to stand, detaching this from the mold, then, removing a solvent by drying.

For flowing a mixed powder slurry into a mold and molding this, casting molding is suitably used in general. By flowing a mixed powder slurry into a mold in casting molding, allowing this to stand, removing this from the mold, then, removing a solvent by heat drying or natural drying under a temperature condition of 40 to 60° C.

In the present invention, "green body" means a silicon carbide molded body before reaction sintering having a lot of pores present inside, obtained by removing a solvent from a mixed powder slurry.

(3) Regarding the Process of Obtaining Temporary Sintered First Body

The sintered first body is obtained by temporarily sintering a green body.

The temporary sintering temperature is 1200 to 1900° C., preferably 1200 to 1800° C., further preferably 1500 to 1800° C. When less than 1200° C., contact between silicon carbide powders in a green body is not sufficiently promoted, resultantly, contact strength is deficient, leading to inconvenient handling, and when over 1900° C., grain growth of a silicon carbide powder in a green body becomes remarkable, and the subsequent permeation of fused high purity silicon becomes insufficient.

The temperature rising speed of the above-mentioned temporary sintering is preferably from 1 to 3° C./min until 800° C., and preferably from 5 to 8° C./min from 800° C. to the maximum temperature, and it is advantageous to appropriately determine the temperature rising speed in view of the form, size and the like of a green body.

The time of maintaining the maximum temperature during the above-mentioned temporary sintering is preferably from 10 to 120 minutes, more preferably from 20 to 60 minutes, and it is advantageous to appropriately determine the maximum temperature maintaining time in view of the form, size and the like of a green body.

It is suitable to conduct the above-mentioned temporary sintering in one of a vacuum atmosphere or inert gas atmosphere from the standpoint of prevention of oxidation.

In the present invention, "temporary sintered first body" means a silicon carbide molded body before reaction sintering from which pores and impurities have been removed obtained by temporarily sintering the above-mentioned green body 1 and containing no carbon source. On the other hand, "temporary sintered second body" described later means a silicon carbide molded body before reaction sintering obtained by temporarily sintering the above-mentioned green body 1 after impregnation with a carbon source and containing no carbon source. Therefore, it is needless to say that "temporary sintered first body" and "temporary sintered second body" should be distinguished.

The bending strength of a temporary sintered body 1 obtained in the above-mentioned process (3) is 20 MPa or more in suitable aspects.

(4) Regarding the Process of Impregnating Temporary Sintered First Body with Phenol Resin By impregnating a temporary sintered first body with a phenol resin as a carbon source, a temporary sintered first body impregnated with a phenol resin is obtained.

The impregnation method is not particularly restricted providing a phenol resin is impregnated into a temporary sintered first body, and it is preferable to impregnate a phenol resin using a capillary phenomenon, and it is further preferable to impregnate a phenol resin into a temporary sintered first body using a cold isotropic press (CIP) method.

In the case of use of a capillary phenomenon, there is a tendency that when the size of the finally obtained sintered silicon carbide is larger, a difference in density between the peripheral part and the central part is larger and obtaining a sintered silicon carbide of uniform density becomes difficult. On the other hand, in the case of impregnation of a phenol resin into a temporary sintered first body using a cold isotropic press (CIP) method, a sintered silicon carbide of uniform density can be produced without limitation even if the volume of the sintered silicon carbide is large. Therefore, it is preferable to use a cold isotropic press (CIP) method from the standpoint that a phenol resin can be impregnated uniformly into a temporary sintered first body without limiting the size of the finally obtained temporary sintered body.

For impregnation of a phenol resin as a carbon source into a temporary sintered first body using a cold isotropic press (CIP), a temporary sintered first body can be impregnated with a phenol resin according to the following process using a cold isotropic press (CIP) treating apparatus conventionally known.

First, a temporary sintered first body and a phenol resin as a carbon source are added into a flexible mold, this mold is sealed, then, a phenol resin in an amount exceeding the calculated value obtained in view of actual carbon ratio and giving sufficient impregnation of a green body is added to the flexible mold. Specifically, it is preferable that a temporary sintered first body and a phenol resin are added to the above-mentioned flexible mold at a ratio of temporary sintered body:phenol resin of 1:3 to 1:6 (volume ratio). As the above-mentioned flexible mold, there can be used a mold which at least can be sealed tightly and can impart pressure to a substance accommodated in the mold toward all directions simultaneously. Specifically, it is preferable to use rubber molds and rubber bags. As the phenol resin, a liquid resol type phenol resin is preferably used.

Next, this sealed mold is placed in a pressing chamber in a pressing vessel, further, the chamber is filed with liquid for pressing, then, sealed with a cap of the pressing vessel. As the above-mentioned liquid for pressing, liquid showing high compressibility can be used. Specifically, it is preferable to use water and 30% boric acid water due to high compressibility and excellent workability.

Thereafter, by conducting cold isotropic press (CIP) treatment under given conditions, a temporary sintered first body is impregnated with a carbon source. For conducting the above-mentioned cold isotropic press (CIP) treatment, it is preferable that pressure is increased up to 1000 to 5000 kg/cm$^2$ over 1 hour at room temperature, then, the pressure is maintained for 0.5 hours under the above-mentioned condition. When the above-mentioned pressure is 1000 kg/cm$^2$ or less, impregnation tends to become insufficient, and when 5000 kg/cm$^2$ or more, there is a tendency of breakage in decreasing pressure. More preferably, the cold isotropic press (CIP) treatment is conducted by increasing pressure up to 2500 to 3500 kc/cm$^2$ over 2 hours, and maintaining this condition for 1 hour. In this case, it is preferable to maintain given pressure, then, decrease pressure down to normal pressure over about 2 hours.

By conducting the above-mentioned cold isotropic press (CIP) treatment, a phenol resin as a carbon source is uniformly impregnated into the whole body of a temporary sintered first body, resultantly, the purity of the resulting final product, sintered silicon carbide increases.

In the present invention, "cold isotropic press (CIP) treatment (method)" means a treatment method of imparting high pressure uniformly to the whole surface of a molded body utilizing equivalent pressure or hydrostatic pressure. As the cold isotropic press (CIP) treatment, there are treatments using a gas medium in addition to the above-mentioned treatment using a liquid medium as a pressure medium. If the above-mentioned cold isotropic press (CIP) treatment condition is satisfied, treatment methods using a gas medium may be used, however, it is preferable to conduct the cold isotropic press (CIP) treatment using a liquid medium from the economical standpoint.

(5) Regarding the Process of Obtaining Temporary Sintered Second Body

The temporary sintered second body is obtained by temporarily sintering a temporary sintered first body impregnated with a phenol resin obtained by the above-mentioned process.

By this temporary sintering, a carbon component contributing to reaction sintering can be obtained.

The temporary sintering temperature is from 900 to 1400° C., preferably from 900 to 1200° C., further preferably from 950 to 1100° C. When less than 900° C., carbonization becomes insufficient, and when over 1400° C., a carbonization component tends to evaporate. The temperature rising speed of the above-mentioned temporary sintering is preferably from 2 to 4° C./min until 600° C., and preferably from 8 to 10° C./min from 600° C. to the maximum temperature, and it is advantageous to appropriately determine the temperature rising speed in view of the form, size and the like of a temporary sintered first body. The time of maintaining the maximum temperature during the above-mentioned temporary sintering is preferably from 10 to 60 minutes, more preferably from 20 to 30 minutes, and it is advantageous to appropriately determine the maximum temperature maintaining time in view of the form, size and the like of a temporary sintered first body.

It is suitable to conduct the above-mentioned temporary sintering in one of a vacuum atmosphere or inert gas atmosphere from the standpoint of prevention of oxidation.

The bending strength of a temporary sintered second body obtained in the above-mentioned process (5) is 20 MPa or more, further preferably 23 MPa or more. Since a temporary sintered second body has strength sufficient for temporary molding, the molding work ability of a temporary sintered body is finally improved by temporarily molding a temporary sintered second body. Namely, molding workability is improved by increase in the strength of a temporary sintered body (2).

(6) Regarding the Process of Obtaining Silicon Carbide

A sintered second body produced via the above-mentioned process is immersed in a metal silicon of high purity melted by heating at temperatures of not lower than the melting point of the metal silicon of high purity, specifically at 1450 to 1700° C. under a vacuum atmosphere or an inert gas atmosphere, to obtain a silicon carbide (sintered body).

By impregnating a sintered second body into a melted metal silicon, the silicon turned into liquid permeates into pores in the sintered second body by a capillary phenomenon, and this silicon is reacted with free carbon in the sintered second body. By this reaction, a silicon carbide is produced, and pores in the sintered second body are filled with the produced silicon carbide.

Since the reaction of a silicon with free carbon occurs at about 1420 to 2000° C. as shown in the process of producing a silicon carbide powder, a reaction with free carbon progresses when a melted metal silicon of high purity heated up to 1450 to 1700° C. permeates into a sintered second body.

The time of immersing a sintered second body into a melted metal silicon is not particularly restricted, and is appropriately determined depending on its size and the amount of free carbon in a sintered second body. A metal silicon of high purity is melted by heating up to 1450 to 1700° C., preferably, 1550 to 1650° C., however, when this melting temperature is less than 1450° C., the viscosity of a metal silicon of high purity increases, and resultantly, it does not permeate into a sintered second body by a capillary phenomenon, and when over 1700° C., its evaporation becomes remarkable to injure a furnace body and the like.

As the metal silicon of high purity, metal silicons in the form of powder, granule and block are mentioned, and metal silicons in the form of block of 2 to 5 mm are suitably used. In the present invention, the high purity means a impurity content of less than 1 ppm.

By reacting free carbon contained in a sintered second body with a silicon and filling pores in the sintered second body with the produced silicon carbide, a sintered silicon carbide is obtained of high density and having an excellent electric property.

By the above-mentioned reaction sintering method, a sintered silicon carbide can be obtained having high purity, high density, high toughness and conductivity and capable of being subjected to discharge working. In the above-mentioned reaction sintering method, the production apparatus and the like are not particularly restricted providing the above-mentioned heating conditions of the present invention are satisfied, and known heating furnaces and reaction apparatuses can be used.

Thus obtained sintered silicon carbide is sufficiently densified and has a density of 2.9 g/cm$^3$ or more. Since it is reported that, in general, when the density of a sintered body is less than 2.9 g/cm$^3$, electric physical properties and dynamic properties such as bending strength, breakage strength and the like lower, further, particle increases and a polluting property deteriorates, it can be concluded that a sintered silicon carbide of the present invention has excellent dynamic properties and electric properties. The density of a sintered silicon carbide of the present invention in preferable aspects is 3.0 g/cm$^3$ or more.

When the resulted sintered body is a porous body, it has poor physical properties such as poor heat resistance, oxidation resistance, chemical resistance and mechanical strength, difficult washing, generation of fine cracking to give fine pieces as a polluting substance, gas permeation and the like, causing problems such as limitation of application, and the like. In a sintered silicon carbide of the present invention, the above-mentioned problems ascribable to the porous body are not causes easily.

The total impurity content of a sintered silicon carbide obtained in the present invention is less than 5 ppm, preferably less than 3 ppm, more preferably less than 1 ppm, however, from the standpoint of application to the semiconductor industry field, these impurity contents by chemical analysis only show a reference value. Practically, evaluation varies depending on whether impurities are uniformly distributed or localized. Therefore, those skilled in the art evaluate to what extent impurities pollute a wafer under given heating condition using a practical apparatus in general by various means. According to a production method comprising a calcination process in which a liquid silicon compound, a nonmetal-based sintering aid and a polymerization or cross-linking catalyst are uniformly mixed to obtain solid which is heat-carbonized under a non-oxidation atmosphere, then, further calcinated under a non-oxidation atmosphere, the total content of impurities other than silicon, carbon and oxygen contained in a sintered silicon carbide can be controlled to less than 1 ppm.

Additionally, for investigation of the preferable physical properties of a sintered silicon carbide obtained in the present invention, the bending strength at room temperature is 400 to 700 MPa, the Vickers hardness is 1500 kgf/mm$^2$ or more, the Poisson's ratio is 0.14 to 0.21, thermal expansion coefficient is $3.8\times10^{-6}$ to $4.5\times10^{-6}$ (° C.$^{-1}$), the thermal conductivity is 150 W/m·k or more, the specific heat is 0.60 to 0.70 J/g·K, the specific resistance is $1\times10^{-1}$ Ωcm or less, for example.

A sintered silicon carbide of the present invention obtained as describe above suitably has physical properties as described below.

The sintered silicon carbide of the present invention has a volume resistivity of 1 Ωcm or less, and in a further preferable aspect, of 0.5 to 0.05 Ωcm.

The sintered silicon carbide of the present invention has a total content of irreversible elements other than silicon and carbon in the sintered silicon carbide, namely, impurity elements of less than 5 ppm.

The sintered silicon carbide of the present invention has a density of 2.9 g/cm$^3$ or more, and in a further preferable aspect, of 3.00 to 3.15 g/cm$^3$.

The sintered silicon carbide of the present invention has a bending strength of 400 MPa or more, and in a further preferable aspect, of 500 to 700 MPa.

A sintered body obtained by the above-mentioned production method is subjected to working, polishing, washing and the like depending on the use object. The sintered body of the present invention can be produced by forming a cylindrical sample (sintered body) and effecting slice working on this along the radial direction, and as this working method, electric discharge working is suitably used. This is used for semiconductor production parts, electronic information equipment parts and the like.

Here, listed as the main semiconductor production apparatus in which parts made of a sintered body of the present invention are used are an exposure apparatus, resist treatment apparatus, dry etching apparatus, washing apparatus, heat treatment apparatus, ion injection apparatus, CVD apparatus, PVD apparatus, dicing apparatus and the like, and examples of the parts include a plasma electrode for a dry etching apparatus, a protective ring (focus ring), a slit part (aperture) for an ion injection apparatus, a protective plate for an ion generation portion or mass spectrometry portion, a dummy wafer used in wafer treatment in a heat treatment apparatus or a CVD apparatus, a heat generation heater in a heat treatment apparatus, CVD apparatus or PVD apparatus, particularly, a heater having a lower portion directly heating a wafer, and the like.

As the electron information equipment part, listed are a disc foundation bed for a hard disk apparatus, a membrane magnetic head foundation bed and the like, and a sputtering target for formation of a membrane on the surface of a photomagnetic disc or on various sliding surfaces is also involved in this part.

As the optical part used, reflection mirrors for synchrotron radiation (SR), laser light, and the like are also involved.

In the production method of the present invention, known heating furnaces and reaction apparatuses can be used considering the pressure resistance of a sintering mold without particularly being limited to production apparatuses and the like provided that the above-mentioned heating conditions can be satisfied.

Regarding the purity of a silicon carbide powder which is a raw material powder of the present invention, a silicon source and a nonmetal-based sintering aid for producing a raw material powder, and further, an inert gas used for making a non-oxidation atmosphere, it is preferable that the content of each impurity element is 1 ppm or less, however, the content is not necessarily limited to this providing it is in the range in which purification in heating and calcination processes is permissible. The impurity elements here include elements belonging to group 1 to group XVI in the periodic table according to 1989 IUPAC in organic chemistry nomenclature revised edition, having an atomic number of 3 or more, and excluding elements having an atomic number of 6 to 8 and 14 to 16.

One preferable embodiment has been described above, however, but it is needless to say that the scope of the present invention is not limited to the above-mentioned embodiment.

The above-mentioned embodiment has a constitution in which, subsequent to (5) the process of obtaining a temporary sintered second body, (6) a metal silicon is impregnated into the temporary sintered second body and reacted with a silicon sucked into the temporary sintered second body to obtain a silicon carbide body.

In this case, from the standpoint of improvement in molding workability, a constitution may also be made in which, subsequent to (5) the process of obtaining a temporary sintered second body, (5-1) the temporary sintered second body is molding-worked into a given shape, then, (6) a metal silicon is impregnated into the temporary sintered second body and reacted with a silicon sucked into the temporary sintered second body to obtain a silicon carbide body.

The strength of the above-mentioned temporary sintered second body is higher than that of temporary sintered bodies obtained by conventional methods and lower than that of the finally obtainable sintered silicon carbide. Therefore, molding workability can be improved via the above-mentioned process (5-1), namely, a process of working the above-mentioned temporary sintered second body having strength suitable for molding working.

From the standpoint of improving molding workability, a constitution may also be made in which, subsequent to (3) the process of obtaining a temporary sintered first body, (3-1) the temporary sintered first body is molding-worked into a given shape, then, (4) the temporary sintered first body is impregnated with a phenol resin.

The strength of the above-mentioned temporary sintered first body is higher than that of temporary sintered bodies obtained by conventional methods and lower than that of the finally obtainable sintered silicon carbide. Therefore, molding workability can be improved via the above-mentioned process (3-1), namely, a process of working the above-mentioned temporary sintered first body having strength suitable for molding working.

EXAMPLES

The following examples and comparative examples will describe the present invention specifically, but it is needless to say that the scope of the present invention is not limited to the following examples.

Example 1

First, to 100 parts of a silicon carbide powder of high purity having a center particle size 1.1 μm (silicon carbide having an impurity content of 5 ppm or less produced according to a production method described in Japanese Patent Application Laid-Open No. 9-48605/containing 1.5 wt % silica) was added 40 parts of water, 0.3 parts of a deflocculant and 3 parts of a binder, further, the silicon carbide powder, the water the deflocculant and the binder were dispersed and mixed for 24 hours in a ball mill, to obtain a mixed powder slurry having a viscosity of 1 poise as a silicon carbide powder.

This mixed powder slurry was cast into a gypsum mold having a length of 60 mm, a width of 10 mm and a thickness of 5 mm, and air-dried at 22° C. for 24 hours to obtain a green body.

Next, the green body was heated up to 1800° C. over a period of 10 hours under an argon atmosphere in a graphite crucible having an internal diameter of 200 mm and a height of 80 mm, and temporarily sintered at the above-mentioned temperature for 1 hour, to obtain a temporary sintered first body.

A resol type phenol resin (manufactured by Sumitomo Chemical Co., Ltd, tradename: "SK Light") in an amount 6-fold of the volume of the molded body, as a phenol resin, was charged in a rubber mold, then, subjected to cold isotropic pressure (CIP) treatment under conditions of 1540° C. and a pressure of 1.2 ton, to impregnate the above-mentioned sintered first body with a phenol resin.

After the foregoing CIP treatment, the temporary sintered first body impregnated with a phenol resin was temporarily sintered at 1200° C. in the same manner as described above to obtain a temporary sintered second body.

Then, a reaction sintered body was obtained by conducting Si impregnation treatment under 1540° C. using a metal silicon as a Si source.

Example 2

A reaction sintered body was obtained in the same manner as in the above-mentioned Example 1 except that the CIP pressure was 3 ton.

Reference Example 1

A reaction sintered body was obtained in the same manner as in the above-mentioned Example 1 except that the CIP pressure was 0.9 ton.

Reference Example 2

First, to 100 parts of a silicon carbide powder of high purity having a center particle size 1.1 µm (silicon carbide having an impurity content of 5 ppm or less produced according to a production method described in Japanese Patent Application Laid-Open No. 9-48605/containing 1.5 wt % silica) was added 50 parts of water, 8 parts of a carbon black powder as a carbon source, 1.8 parts of Poise 532A (manufactured by Kao Corp.) as a deflocculant and 3 parts of PVA (manufactured by Kanto Kagaku K.K., reagent grade) as a binder, further, they were dispersed and mixed for 24 hours in a ball mill, to obtain a mixed powder slurry having a viscosity of 2 poise as a silicon carbide powder.

This mixed powder slurry was cast into a gypsum mold having a length of 60 m, a width of 10 mm and a thickness of 5 mm, and air-dried at 22° C. for 24 hours to obtain a green body.

Next, the green body was heated up to 1800° C. over a period of 10 hours under conditions of an argon atmosphere and reduced pressure in a graphite crucible having an internal diameter of 200 mm and a height of 80 mm, and temporarily sintered at the above-mentioned temperature for 1 hour.

Then, a reaction sintered body was obtained by conducting Si impregnation treatment under 1540° C. using a metal silicon as a Si source.

Reference Example 3

First, to 100 parts of a silicon carbide powder of high purity having a center particle size 1.1 µm (silicon carbide having an impurity content of 5 ppm or less produced according to a production method described in Japanese Patent Application Laid-open No. 9-48605/containing 1.5 wt % silica) was added 108 parts of a resol type phenol resin, 50 parts of water, 1.0 part of Poise 532A (manufactured by Kao Corp.) as a deflocculant and 3 parts of PVA (manufactured by Kanto Kagaku K.K., reagent grade) as a binder, further, they were dispersed and mixed for 24 hours in a ball mill, to obtain a mixed powder slurry having a viscosity of 10 poise as a silicon carbide powder.

This mixed powder slurry was cast into a gypsum mold having a length of 60 mm, a width of 10 mm and a thickness of 5 mm, and air-dried at 22° C. for 24 hours to obtain a green body.

[Evaluation]

Regarding the resulted sintered silicon carbides of Examples 1, 2 and Comparative Examples 1 to 3, the densities (peripheral density, central part density), the volume resistivity (peripheral resistivity, central part resistivity) and the bending strength were measured. The bending strength of the temporary sintered first body and/or green body in Examples 1, 2 and Comparative Examples 1 to 3 was measured. The resulted test results are shown in Table 1.

(Method of Measuring Density by Archimedes Method)

The density of a sintered silicon carbide was measured according to JIS R1634.

Figure 1:
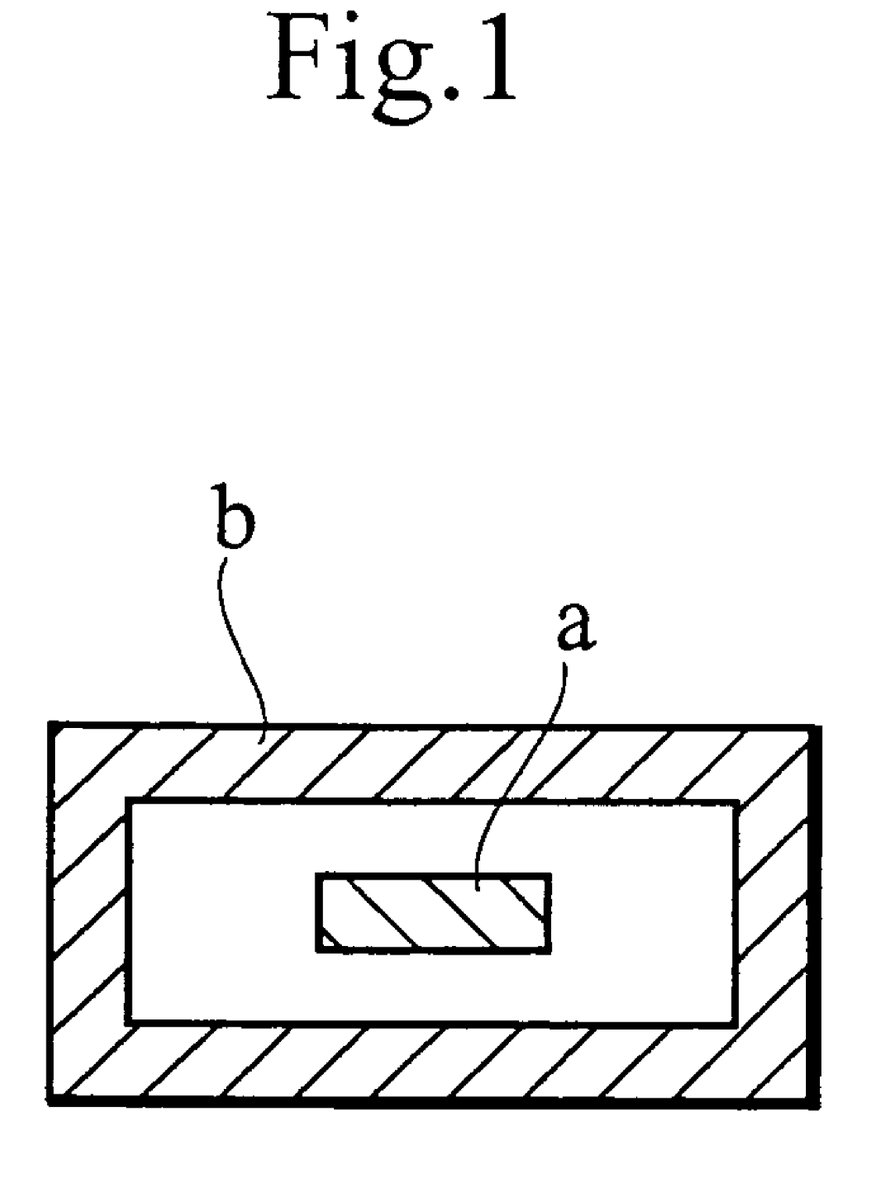
FIG. 1 is a sectional view showing the central part and peripheral parts of a temporary sintered body.

The center density and peripheral density of a sintered silicon carbide shown as a sectional view of a silicon carbide in FIG. 1 were measured.

(Method of Measuring Volume Resistivity by Four-terminal Method)

The volume resistivity of a sintered silicon carbide by a four-terminal method was measured using "LORESTAR Ap" manufactured by Mitsubishi Chemical Co., Ltd. In the measurement, the pin interval is 50 mm and the sample has a length of 60 mm, a width of 15 mm and a thickness of 3 mm. The volume resistivity of the center part a (section of 5×2 mm, 10×5 mm, from the center) and the peripheral part b (section of 2 mm, 10×5 mm, from the side surface) shown in FIG. 1 was measured.

(Three Point Bending Strength)

The three point bending test of a sintered silicon carbide was conducted according to JIS R1601.

TABLE 1

| | | Condition Phenol impregnation CIP treatment (ton/cm$^2$) | Temporary sintered second body[note] (temporary sintered body) Strength [MPa] | Result | | | | |
|---|---|---|---|---|---|---|---|---|
| | | | | Reaction sintered body | | | | |
| | | | | Density [g/cm$^3$] | | Volume resistivity [Ωcm] | | Strength [MPa] |
| | | | | Peripheral | Center | Peripheral | Center | |
| Example | 1 | 1.2 | 21 | 3.10 | 3.09 | 0.09 | 0.08 | 421 |
| | 2 | 3 | 24 | 3.11 | 3.11 | 0.12 | 0.11 | 453 |
| Reference | 1 | 0.9 | 16 | 3.11 | 3.01 | 0.08 | 0.05 | 322 |
| Example | 2 | — | 13 | 2.88 | 2.90 | 0.04 | 0.06 | 305 |
| | 3 | — | Cannot be measured due to occurrence of crack | | | | | |

Remark
[note]temporary sintered second body in Examples, and temporary sintered body in Reference Example 2

From the above-described results, the following facts were 5 confirmed.

(1) Regarding Reaction Sintered Body

It was confirmed that a reaction sintered body of uniform density and high purity is obtained according to the examples since there is no difference in volume resistivity between the peripheral part and the central part of a reaction sintered body in Examples 1 and 2. It was also confirmed that a reaction sintered body according to the examples has excellent bending strength.

The reason for this is hypothesized that in Reference Example 2 using carbon black as a carbon source, density was low both in the peripheral part and the central part of a reaction sintered body, further, its volume resistivity and bending strength were inferior to those in the present example, resultantly, uniformity of the density of a reaction sintered body and its strength increased since particles of a phenol resin used as a carbon source in the example were finer as compared with particles of carbon black used conventionally as a carbon source.

Further, as apparent from the results in Reference Example 3, it was clarified that though it is difficult to produce a sintered silicon carbide by mixing a phenol resin at a stage of preparation of a slurry mixed powder, a sintered silicon carbide using a phenol resin as a carbon source can be optimally produced according to the examples using a CIP method.

(2) Regarding Temporary Sintered Second Body (Temporary Sintered Body)

Since the bending strength of a temporary sintered second body in Examples 1 and 2 was about 1.5-fold of the bending strength of a temporary sintered body in Reference Example 2 produced by a conventional method, it was confirmed that the strength of a temporary sintered second body is remarkably improved by the examples.

(3) Regarding Workability and the Like

In a stage of preparing a mixed powder slurry, a close attention was required for handling of carbon black so as not to pollute working site, additionally, mixing of carbon black took times, in a conventional preparation method using carbon black as a carbon source. However, in the examples (Examples 1 and 2), since handling of carbon black is omitted, the conventional problems are solved and improvement of working site and improvement of workability are attained.

INDUSTRIAL APPLICABILITY

The present invention performs the following actions and effects by the above-mentioned constitution.

(1) A sintered silicon carbide of high purity and high strength is obtained.

(2) The molding workability of a sintered silicon carbide is improved by obtaining the sintered silicon carbide via molding of a temporary sintered second body having given strength.

(3) Working site is improved and workability is improved.

The invention claimed is:

1. A method of producing a sintered silicon carbide using a reaction sintering method, comprising:
    (1) dissolving and dispersing a silicon carbide powder in a solvent to produce a mixed powder slurry,
    (2) flowing the resulted mixed powder into a mold and drying it to obtain a green body,
    (3) temporarily sintering the green body in one of a vacuum atmosphere or inert gas atmosphere at 1200 to 1900° C. to obtain a temporarily sintered first body,
    (4) impregnating the resulted temporarily sintered first body with a phenol resin as a carbon source by a capillary phenomenon while subjecting the temporarily sintered first body to cold isotropic press treatment under a condition of 1 to 5 ton/cm$^2$,
    (5) temporarily sintering the resulted carbon source-impregnated temporarily sintered first body in one of a vacuum atmosphere or inert gas atmosphere at 900 to 1400° C. to obtain a temporarily sintered second body,
    (6) impregnating the resulted temporarily sintered second body with a melted metal silicon by a capillary phenomenon, and reacting free carbon in the temporarily sintered second body with the silicon sucked into the temporarily sintered second body by a capillary phenomenon to obtain a silicon carbide body.

2. The method of producing a sintered silicon carbide according to claim 1, wherein the silicon carbide powder in the process (1) is a silicon carbide powder obtained by a production method comprising: a solidification process of obtaining a solidified substance by solidifying a mixture obtained by uniformly mixing a liquid silicon compound, a liquid organic compound producing carbon by heat, and a polymerization or cross-linking catalyst, and a sintering process of heat-carbonizing the resulted solid substance under a non-oxidation atmosphere, then, further sintering the solid substance under a non-oxidation atmosphere.

3. The method of producing a sintered silicon carbide according to claim 1, wherein the temporarily sintered second body obtained in the process (5) has a bending strength of 20 MPa or more.

* * * * *